(12) United States Patent
Hagino et al.

(10) Patent No.: US 10,950,916 B2
(45) Date of Patent: Mar. 16, 2021

(54) BATTERY AND BATTERY MANUFACTURING METHOD

(71) Applicant: TOYOTA JIDOSHA KABUSHIKI KAISHA, Toyota (JP)

(72) Inventors: Tomotaka Hagino, Toyota (JP); Yuta Nemoto, Okazaki (JP); Tomohiro Ono, Miyoshi (JP); Yoichi Naruse, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 234 days.

(21) Appl. No.: 16/148,355

(22) Filed: Oct. 1, 2018

(65) Prior Publication Data
US 2019/0109315 A1    Apr. 11, 2019

(30) Foreign Application Priority Data

Oct. 6, 2017    (JP) .............................. JP2017-196426

(51) Int. Cl.
| | | |
|---|---|---|
| H01M 2/30 | (2006.01) | |
| H01M 50/543 | (2021.01) | |
| H01M 10/058 | (2010.01) | |
| H01M 10/0525 | (2010.01) | |
| H01M 50/116 | (2021.01) | |
| H01M 50/183 | (2021.01) | |
| H01M 50/528 | (2021.01) | |
| H01M 50/545 | (2021.01) | |

(52) U.S. Cl.
CPC ....... *H01M 50/543* (2021.01); *H01M 10/058* (2013.01); *H01M 10/0525* (2013.01); *H01M 50/116* (2021.01); *H01M 50/183* (2021.01); *H01M 50/528* (2021.01); *H01M 50/545* (2021.01)

(58) Field of Classification Search
CPC ...... H01M 2/027; H01M 2/0277; H01M 2/08; H01M 2/30
USPC .......................................................... 429/181
See application file for complete search history.

(56) References Cited

U.S. PATENT DOCUMENTS

| | | |
|---|---|---|
| 6,156,452 A | 12/2000 | Kozuki et al. |
| 2013/0224536 A1 | 8/2013 | Hattori et al. |
| 2014/0004408 A1 | 1/2014 | Ehara |
| 2015/0180007 A1 | 6/2015 | Ohta |

(Continued)

FOREIGN PATENT DOCUMENTS

| | | |
|---|---|---|
| EP | 2958160 A1 | 12/2015 |
| EP | 3179537 A1 | 6/2017 |

(Continued)

*Primary Examiner* — James M Erwin
(74) *Attorney, Agent, or Firm* — Sughrue Mion, PLLC

(57) ABSTRACT

A battery manufacturing method includes assembling an internal terminal, a gasket, a battery case component, an insulator, and an external terminal into a state where a cylindrical part of the gasket is fitted in a mounting hole of the battery case component, a projecting part of the internal terminal is fitted in the cylindrical part of the gasket, the insulator is disposed on an outer surface of the battery case component with the projecting part fitted in a through-hole, and the external terminal is disposed on top of the insulator so as to lie on the projecting part. The external terminal is pressed against the projecting part of the internal terminal, and the external terminal or the internal terminal is vibrated to thereby weld together the projecting part and the external terminal in a solid state.

9 Claims, 6 Drawing Sheets

(56) References Cited

U.S. PATENT DOCUMENTS

2015/0318519 A1 11/2015 Tsutsumi et al.
2015/0364731 A1 12/2015 Yoo et al.
2017/0117510 A1 4/2017 Takasu et al.

FOREIGN PATENT DOCUMENTS

| JP | 8-203494 A | 8/1996 |
|---|---|---|
| JP | 11-195434 A | 7/1999 |
| JP | 2010-89156 A | 4/2010 |
| JP | 2013-161629 A | 8/2013 |
| JP | 2014-011073 A | 1/2014 |
| JP | 2017-084585 A | 5/2017 |
| KR | 10-2015-0022850 A | 3/2015 |
| KR | 10-1532216 B1 | 6/2015 |
| WO | 2014/103874 A1 | 7/2014 |

BATTERY AND BATTERY MANUFACTURING METHOD

INCORPORATION BY REFERENCE

The disclosure of Japanese Patent Application No. 2017-196426 filed on Oct. 6, 2017 including the specification, drawings and abstract is incorporated herein by reference in its entirety.

BACKGROUND

1. Technical Field

The present disclosure relates to a battery and a battery manufacturing method.

2. Description of Related Art

Japanese Patent Application Publication No. 2014-11073 discloses a method in which a shaft part of an internal terminal is inserted through a battery case and an external terminal and swaged onto the external terminal, and then an outer circumferential edge of a swaged portion is laser-welded to the external terminal. Japanese Patent Application Publication No. 2017-84585 discloses a method in which beads are provided by laser welding along an outer circumferential edge of a swaged portion.

SUMMARY

A welded portion between an internal terminal and an external terminal tends to have lower electrical resistance than other contact portions between the internal terminal and the external terminal, and thus can form a main conduction path between the internal terminal and the external terminal. When the welded portion is located at an outer circumferential edge of a swaged portion, for example, a foreign object etc. can come in contact with this welded portion. To maintain high quality of the conduction path between the internal terminal and the external terminal, it is desirable to reduce the likelihood of the phenomenon that a foreign object comes in contact with the welded portion between the internal terminal and the external terminal. Moreover, joining together the internal terminal and the external terminal by laser welding requires a comparatively expensive facility such as a laser welding machine. Therefore, the present disclosure proposes a battery having a whole new structure and a manufacturing method of this battery.

A battery according to a first aspect of the present disclosure includes a battery case component having a mounting hole, an internal terminal, an external terminal, and an insulation member. Here, the insulation member is interposed between the internal terminal and the battery case component and interposed between the external terminal and the battery case component. The internal terminal includes a base part that is laid on the inner side of the battery case component with the insulation member interposed between the base part and the battery case component, and a projecting part that protrudes from the base part and is fitted on the battery case component by being inserted through the mounting hole with the insulation member interposed between the projecting part and an inner periphery of the battery case component defining the mounting hole. The external terminal is laid on the projecting part inserted through the mounting hole, and includes a weld at which the external terminal is welded to the projecting part of the internal terminal. The battery with this structure has the weld at a position where the external terminal is laid on the projecting part of the internal terminal, which can reduce the likelihood that a foreign object etc. from outside comes in contact with the weld.

In the battery according to the first aspect of the present disclosure, the internal terminal may further have a shaft part rising from the projecting part, and the external terminal may further have an insertion hole through which the shaft part is inserted. In this case, the shaft part may be inserted through the insertion hole and swaged around the insertion hole.

Here, the weld may be located farther on the radially outer side than a portion of the shaft part of the internal terminal that is swaged around the insertion hole of the external terminal. The projecting part to which the external terminal is joined may have a groove. The external terminal and the projecting part may be welded together along a circumferential direction around the shaft part of the internal terminal.

The insulation member may include a gasket that has a flange part laid on an inner surface of the battery case component around the mounting hole and a cylindrical part protruding from the flange part and fitted in the mounting hole, and an insulator that has a through-hole in which the projecting part inserted through the mounting hole is fitted and that is laid on an outer surface of the battery case component. In this case, the base part of the internal terminal may be laid on the gasket on the inner side of the battery case component. The projecting part may be fitted in the mounting hole of the battery case component by being inserted through the cylindrical part of the gasket. The external terminal may be laid on the outer side of the battery case component with the insulator interposed between the external terminal and the battery case component.

A battery manufacturing method according to a second aspect of the present disclosure include: preparing a battery case component in which a mounting hole is formed; preparing a gasket having a cylindrical part that is fittable into the mounting hole; preparing an internal terminal having a projecting part that is fittable into the cylindrical part; preparing an insulator having a through-hole into which the projecting part is fitted; preparing an external terminal that is disposed on top of the insulator so as to lie on the projecting part; assembling the internal terminal, the gasket, the battery case component, the insulator, and the external terminal; and welding together the external terminal and the projecting part of the internal terminal by pressing the external terminal against the projecting part and vibrating the external terminal or the internal terminal.

Here, in the assembly step of assembling the internal terminal, the gasket, the battery case component, the insulator, and the external terminal, a state is established where the cylindrical part of the gasket is fitted in the mounting hole of the battery case component, the projecting part of the internal terminal is fitted in the cylindrical part of the gasket, the insulator is disposed on an outer surface of the battery case component with the projecting part fitted in the through-hole, and the external terminal is disposed on top of the insulator so as to lie on the projecting part. Next, the external terminal is pressed against the projecting part of the internal terminal, and the external terminal or the internal terminal is vibrated to thereby weld together the projecting part and the external terminal in a solid state. This method uses a solid-state welding machine that is inexpensive compared with a laser welding machine in the welding step for forming a conduction path between the internal terminal and the external terminal, and therefore can keep down the facility cost in the welding step for forming a conduction path between the internal terminal and the external terminal.

The internal terminal prepared may have a shaft part rising from the projecting part. The external terminal prepared may have an insertion hole through which the shaft part is inserted. In the assembly step, the external terminal may be disposed on top of the insulator such that the shaft part is inserted through the insertion hole. The method may further include a swaging step of swaging the shaft part around the insertion hole after the welding step.

In the welding step, for example, the internal terminal and the external terminal may be held between a horn and an anvil, and ultrasonic vibration may be applied to the internal terminal or the external terminal while the external terminal and the projecting part of the internal terminal are pressed against each other.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
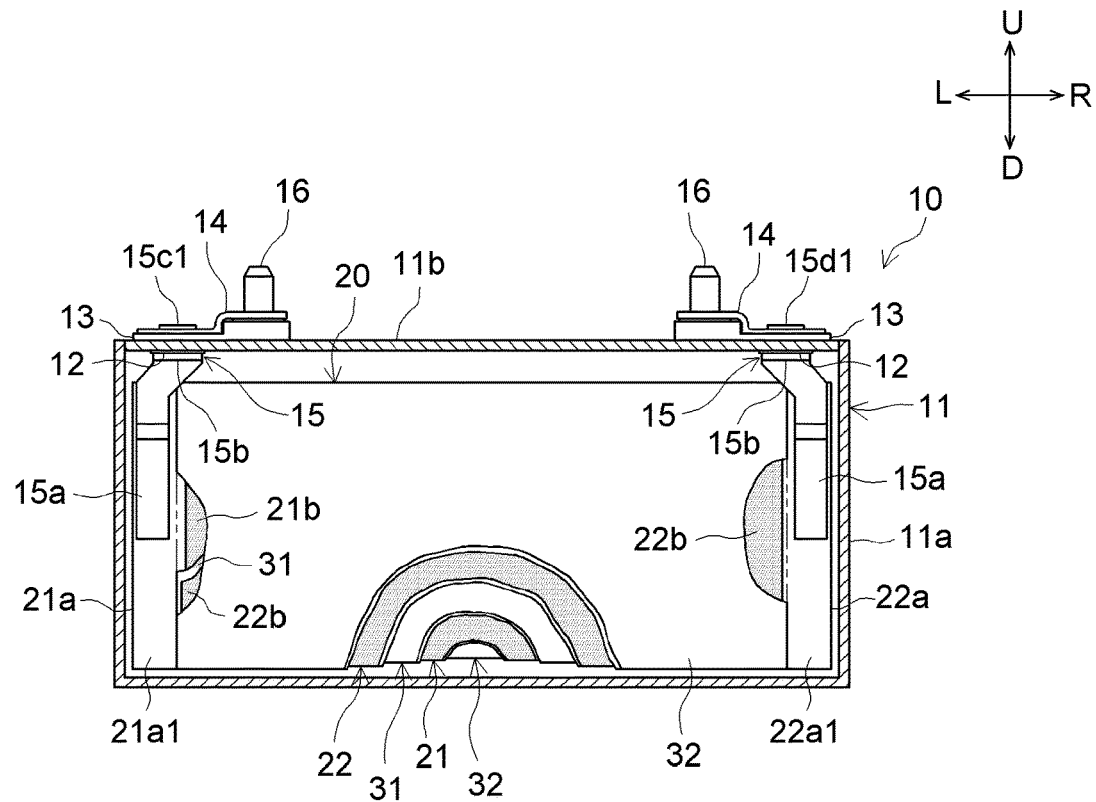
FIG. 1 is a partial sectional view of a sealed battery 10 according to an embodiment of the present disclosure.

An embodiment of a battery and a battery manufacturing method proposed herein will be described below. It should be understood that the embodiment described herein is not intended to particularly limit the present disclosure. Unless otherwise mentioned, the present disclosure is not limited to the embodiment described herein. The drawings are schematic and do not necessarily reflect actual objects. Those members and portions that have the same effects are denoted by the same reference sign as appropriate to omit redundant description. Upward, downward, leftward, rightward, frontward, and rearward directions are indicated in the drawings by the arrows U, D, L, R, F, and Rr, respectively.

Figure 2:
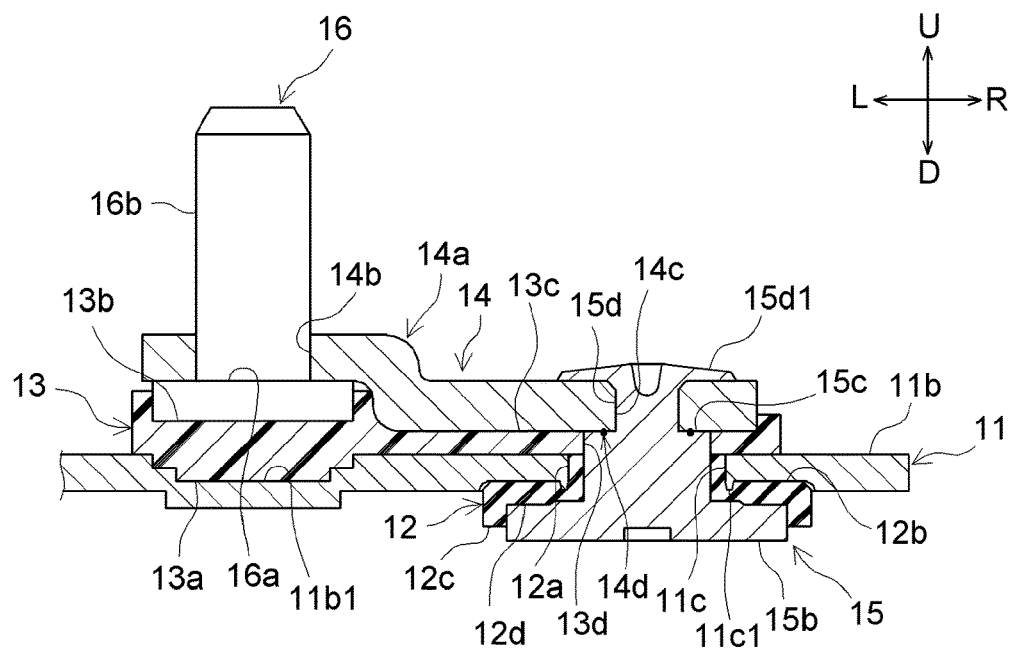
FIG. 2 is a sectional view showing a part where an external terminal 14 and an internal terminal 15 are mounted on a battery case 11.

Here, the battery and the battery manufacturing method will be described by using a sealed battery 10 shown in FIG. 1 and FIG. 2 as an example. FIG. 1 is a partial sectional view of the sealed battery 10 according to the embodiment of the present disclosure. FIG. 1 shows a state where an interior of the sealed battery 10 is exposed along a wide surface on one side of a substantially rectangular parallelepiped battery case 11. FIG. 2 is a sectional view showing a part where an external terminal 14 and an internal terminal 15 are mounted on the battery case 11. As shown in FIG. 1 and FIG. 2, the sealed battery 10 includes the battery case 11, gaskets 12, insulators 13, the external terminals 14, the internal terminals 15, connection terminals 16, and an electrode body 20.

The electrode body 20 is housed in the battery case 11 in a state of being covered with an insulation film (not shown). The electrode body 20 includes a positive electrode sheet 21 as a positive electrode element, a negative electrode sheet 22 as a negative electrode element, and separator sheets 31, 32 as separators. Each of the positive electrode sheet 21, the first separator sheet 31, the negative electrode sheet 22, and the second separator sheet 32 is an elongated band-shaped member.

The positive electrode sheet 21 is a positive electrode current collector foil 21a (e.g., an aluminum foil) of predetermined width and thickness, on both sides of which a positive electrode active material layer 21b containing a positive electrode active material is formed except for a non-formed portion 21a1 provided at a constant width along an end of the positive electrode current collector foil 21a on one side in a width direction. The non-formed portion 21a1 is a portion of the current collector foil on which the active material is not coated. For example, in the case of a lithium-ion secondary battery, the positive electrode active material is a material such as a lithium transition metal composite material that can release lithium ions during charge and absorb lithium ions during discharge. However, various positive electrode active materials other than a lithium transition metal composite material have been commonly proposed, and the positive electrode active material here is not particularly limited.

The negative electrode sheet 22 is a negative electrode current collector foil 22a (here, a copper foil) of predetermined width and thickness, on both sides of which a negative electrode active material layer 22b containing a negative electrode active material is formed except for a non-formed portion 22a1 provided at a constant width along an edge of the negative electrode current collector foil 22a on one side in a width direction. For example, in the case of a lithium-ion secondary battery, the negative electrode active material is a material such as natural graphite that can occlude lithium ions during charge and release the occluded lithium ions during discharge. However, various negative electrode active materials other than natural graphite have been commonly proposed, and the negative electrode active material here is not particularly limited.

For example, a porous resin sheet that has required heat resistance and allows passage of an electrolyte is used as the separator sheets 31, 32. However, various separator sheets have been proposed, and the separator sheets 31, 32 are not particularly limited.

Here, for example, the width of the negative electrode active material layer 22b is set to be larger than the width of the positive electrode active material layer 21b. The widths of the separator sheets 31, 32 are larger than the width of the negative electrode active material layer 22b. The non-formed portion 21a1 of the positive electrode current collector foil 21a and the non-formed portion 22a1 of the negative electrode current collector foil 22a are oriented toward the opposite sides in the width direction. The positive electrode sheet 21, the first separator sheet 31, the negative electrode sheet 22, and the second separator sheet 32 are rolled in a state of being stacked in this order with long sides thereof oriented in the same direction. The negative electrode active material layer 22b covers the positive electrode active material layer 21b with the separator sheets 31, 32 interposed therebetween. The negative electrode active material layer 22b is covered with the separator sheets 31, 32. The non-formed portion 21a1 of the positive electrode current collector foil 21a protrudes from one side of the separator sheets 31, 32 in the width direction. The non-formed portion 22a1 of the negative electrode current collector foil 22a protrudes from the opposite side of the separator sheets 31, 32 in the width direction.

As shown in FIG. 1, the electrode body 20 is flattened along a plane including an axis of rolling so as to be housed in a case main body 11a of the battery case 11. The non-formed portion 21a1 of the positive electrode current collector foil 21a and the non-formed portion 22a1 of the negative electrode current collector foil 22a are disposed respectively on one side and the opposite side along the axis of rolling of the electrode body 20. The non-formed portion 21a1 of the positive electrode current collector foil 21a and the non-formed portion 22a1 of the negative electrode current collector foil 22a are mounted on the internal terminals 15 that are mounted respectively at both sides of the lid 11b in a longitudinal direction of the lid 11b. The electrode body 20 is housed in the battery case 11 in a state of being thus mounted on the internal terminals 15 mounted on the lid 11b.

The battery case 11 has a flat rectangular housing region, and includes the case main body 11a and the lid 11b. For the battery case, aluminum or aluminum alloy such as 1000- or 3000-series aluminum can be used. In this embodiment, the case main body 11a has a flat, substantially rectangular parallelepiped container shape, and is open at one surface defined by long sides and short sides. The lid 11b is a plate-like member that has a shape matching the opening of the case main body 11a and is fitted to this opening. A mounting hole 11c (see FIG. 2) for mounting the external terminal 14 and the internal terminal 15 is formed at each side of the lid 11b in the longitudinal direction. In this embodiment, a projection 11c1 protruding toward an inner side of the lid 11b is provided at an edge of the mounting hole 11c.

As shown in FIG. 2, the battery proposed herein includes a battery case component (in this embodiment, the lid 11b), the internal terminal 15, the external terminal 14, and insulation members (12, 13). Here, the insulation members are interposed between the internal terminal 15 and the external terminal 14 on one side and the lid 11b as the battery case component on the other side. In this embodiment, the insulation members include the gasket 12 and the insulator 13.

As shown in FIG. 1 and FIG. 2, the internal terminal 15 includes a lead part 15a, a base part 15b, a projecting part 15c, and a shaft part 15d.

As shown in FIG. 1 and FIG. 2, the base part 15b is a part laid on the gasket 12 on the inner side of the lid 11b, and is mounted on the lid 11b with the gasket 12 interposed between the base part 15b and the lid 11b. The lead part 15a is a part extending from the base part 15b toward the inner side of the battery case 11. In FIG. 1, the non-formed portion 21a1 of the positive electrode current collector foil 21a of the electrode body 20 is welded to the lead part 15a of the internal terminal 15 on the left side. The non-formed portion 22a1 of the negative electrode current collector foil 22a of the electrode body 20 is welded to the lead part 15a of the internal terminal 15 on the right side. The projecting part 15c protrudes from the base part 15b, and is fitted on the lid 11b by being inserted through the mounting hole 11c of the lid 11b with the gasket 12 interposed between the projecting part 15c and the mounting hole 11c. The shaft part 15d rises from a center portion of the projecting part 15c. Here, the portion from which the shaft part 15d rises (i.e., the center portion of the projecting part 15c) need not be at the exact center of the projecting part 15c. The shaft part 15d may be offset from the center of the projecting part 15c.

The gasket 12 is interposed between the internal terminal 15 and the mounting hole 11c of the lid 11b, and serves to keep the mounting hole 11c of the lid 11b sealed and insulate the lid 11b and the internal terminal 15 from each other. The gasket 12 is formed by a resin member having required elasticity. For example, tetrafluoroethylene-perfluoroalkyl vinyl ether copolymer (also called PFA) can be used for the gasket 12.

In this embodiment, the gasket 12 has a cylindrical part 12a, a flange part 12b, a surrounding part 12c, and a receiving part 12d. The cylindrical part 12a is a part that protrudes from the flange part 12b, and is a part through which the projecting part 15c and the shaft part 15d of the internal terminal 15 are inserted and which is fitted on an inner circumferential surface of the mounting hole 11c of the lid 11b. The cylindrical part 12a has an inside diameter that is substantially equal to the outside diameter of the projecting part 15c of the internal terminal 15, and has an outside diameter that is substantially equal to the inside diameter of the mounting hole 11c. The flange part 12b is a plate-like part that extends from one end of the cylindrical part 12a along a radial direction and is fitted on an inner surface of the lid 11b. The surrounding part 12c extends from a circumferential edge of the flange part 12b toward the opposite side from the cylindrical part 12a. The receiving part 12d is provided on a lower surface of the gasket 12. The receiving part 12d is a part which has a recess matching the shape of the base part 15b of the internal terminal 15 to be described later, and by which the base part 15b is positioned.

As shown in FIG. 2, the gasket 12 is assembled on the projecting part 15c of the internal terminal 15 and fitted in the mounting hole 11c of the lid 11b. Here, the projecting part 15c protrudes from the mounting hole 11c of the lid 11b, and the insulator 13 is assembled on an outer side of the lid 11b. The height of the projecting part 15c of the internal terminal 15 is set such that the projecting part 15c protrudes from the lid 11b in an amount corresponding to the thickness of the insulator 13 in a state where the projecting part 15c is fitted in the cylindrical part 12a of the gasket 12 and further fitted in the mounting hole 11c of the lid 11b. The projecting part 15c is fitted in the mounting hole 11c of the lid 11b in the state of being fitted in the cylindrical part 12a of the gasket 12. The shaft part 15d of the internal terminal 15 rises from the center portion of the projecting part 15c. A leading end 15d1 of the shaft part 15d of the internal terminal 15 is crushed and swaged around an insertion hole 14c on an outer side of the external terminal 14. In FIG. 2, the shaft part 15d of the internal terminal 15 is shown in a state of having been crushed and swaged. The shaft part 15d of the internal terminal 15 before being swaged has a substantially columnar shape (see FIG. 3).

The insulator 13 is a member that is disposed on the outer side of the lid 11b and insulates the lid 11b on one side and the external terminal 14 and the connection terminal 16 on the other side from each other. The insulator 13 is formed by a resin member. For example, polypropylene (also called PP), polyethylene (also called PE), or a polyphenylene sulfide resin (also called PPS) can be used for the insulator 13.

In this embodiment, as shown in FIG. 2, a protrusion 13a is provided on a lower surface of the insulator 13. The protrusion 13a is fitted in a recess 11b1 of the lid 11b. A recess 13b in which the connection terminal 16 is disposed and a recess 13c in which the external terminal 14 is fitted are provided in an upper surface of the insulator 13. A through-hole 13d is formed in the recess 13c in which the external terminal 14 is fitted, at a position corresponding to the mounting hole 11c formed in the lid 11b. The through-hole 13d has substantially the same shape as the projecting part 15c of the internal terminal 15 such that the projecting part 15c can be inserted through the through-hole 13d. The projecting part 15c of the internal terminal 15 protruding from the mounting hole 11c of the lid 11b is fitted in the through-hole 13d, and the insulator 13 is assembled so as to cover the lid 11b.

On the outer side of the lid 11b, the external terminal 14 and the connection terminal 16 are mounted with the insulator 13 interposed therebetween. As shown in FIG. 2, the recess 11b1 is provided in the outer surface of the lid 11b at a position corresponding to a position where the connection terminal 16 is mounted. For the external terminal 14, the internal terminal 15, and the connection terminal 16 on the positive electrode side and those on the negative electrode side, materials that can withstand the required potentials on the respective sides are used. For example, aluminum or aluminum alloy such as 1000-, 3000-, or 6000-series aluminum can be used for the positive electrode side. For the negative electrode side, copper or copper alloy such as 1000-series copper can be used.

As shown in FIG. 2, the external terminal 14 is laid on the outer side of the lid 11b with the insulator 13 interposed therebetween. In this embodiment, the external terminal 14 has the insertion hole 14c through which the shaft part 15d of the internal terminal 15 is inserted. A portion of the external terminal 14 around the insertion hole 14c is laid on the projecting part 15c. The external terminal 14 and the internal terminal 15 are welded together at the portion of the external terminal 14 that is laid on the projecting part 15c of the internal terminal 15. The portion of the external terminal 14 that is laid on the projecting part 15c may be welded along the entire circumference, but it suffices that at least a part of the external terminal 14 in a circumferential direction is welded. Here, the part at which the external terminal 14 and the internal terminal 15 are welded together in the portion of the external terminal 14 around the insertion hole 14c that is laid on the projecting part 15c will be referred to as a weld 14d. Conduction between the external terminal 14 and the leading end 15d1 of the internal terminal 15 is reliably secured as the external terminal 14 and the internal terminal 15 are welded together at the weld 14d.

The external terminal 14 is a member that is disposed on top of the insulator 13 disposed on the outer side of the lid 11b and retains the connection terminal 16. In this aspect, the external terminal 14 is a plate-like member disposed along the longitudinal direction of the lid 11b. A step 14a is provided at an intermediate part of the external terminal 14 in a longitudinal direction. A fitting hole 14b in which a shaft part 16b of the connection terminal 16 is fitted is formed on one side of the step 14a. The insertion hole 14c through which the shaft part 15d of the internal terminal 15 is inserted is formed on the opposite side.

The connection terminal 16 has a flange part 16a and the shaft part 16b. The flange part 16a is positioned and fitted in the recess 13b provided in the insulator 13 that is disposed on the outer side of the lid 11b. Therefore, the flange part 16a and the recess 13b preferably have matching shapes. The shaft part 16b is a part that serves as an external output terminal, and is a part to which, for example, a bus bar is mounted to form a battery pack. In a step of assembling the external terminal 14, the external terminal 14 is assembled on top of the insulator 13. In this embodiment, the shaft part 16b of the connection terminal 16 disposed on top of the insulator 13 is caused to pass through the fitting hole 14b of the external terminal 14. The shaft part 15d of the internal terminal 15 exposed above the insulator 13 is caused to pass through the insertion hole 14c of the external terminal 14. The external terminal 14 is assembled on top of the insulator 13.

In this embodiment, the portion of the external terminal 14 that is laid on the projecting part 15c of the internal terminal 15 is welded after the components are assembled as described above. Moreover, the leading end 15d1 of the shaft part 15d of the internal terminal 15 is swaged on the external terminal 14.

In the battery proposed herein, the internal terminal 15 and the external terminal 14 assembled on the lid 11b as the battery case component are pressed against each other so as to be sandwiched with the gasket 12 and the insulator 13 therebetween, and the shaft part 15d of the internal terminal 15 is deformed. That is, the leading end 15d1 of the shaft part 15d of the internal terminal 15 is deformed. The internal terminal 15, the gasket 12, the insulator 13, and the external terminal 14 are thereby fixed to the lid 11b of the battery case 11.

Thus, as shown in FIG. 2, the internal terminal 15 of the battery 10 has the base part 15b, the projecting part 15c, and the shaft part 15d. The base part 15b is laid on the inner side of the lid 11b as the battery case component with the insulation member (gasket 12) interposed between the base part 15b and the lid 11b. The projecting part 15c protrudes from the base part 15b, and is fitted on the lid 11b by being inserted through the mounting hole 11c with the insulation members (12, 13) interposed between the projecting part 15c and the lid 11b. The shaft part 15d rises from the center portion of the projecting part 15c. The external terminal 14 includes the insertion hole 14c through which the shaft part 15d of the internal terminal 15 is inserted, and the weld 14d which is a portion of the external terminal 14 around the insertion hole 14c laid on the projecting part 15c and at which the external terminal 14 is welded to the internal terminal 15. Moreover, the shaft part 15d of the internal terminal 15 is swaged on the external terminal 14.

In the battery 10, the external terminal 14 includes the weld 14d at which the external terminal 14 is welded to the internal terminal 15, in the portion of the external terminal 14 around the insertion hole 14c laid on the projecting part 15c. The weld 14d is formed on a rear side of the external terminal 14 and is not exposed to a front surface. Therefore, a foreign object from outside is less likely to come in contact with the weld 14d, so that high quality of the conduction path is likely to be maintained. Moreover, in this embodiment, the shaft part 15d of the internal terminal 15 is swaged on the external terminal 14. That is, the internal terminal 15 is swaged like a rivet on the external terminal 14. Therefore, the internal terminal 15 is likely to be maintained in the state of being assembled on the lid 11b, the gasket 12, the insulator 13, and the external terminal 14. Accordingly, even when an external force acts so as to separate the weld 14d, the joint between the internal terminal 15 and the external terminal 14 at the weld 14d is likely to be maintained. Although this is not shown, for example, an outer circumferential edge of the shaft part 15d of the internal terminal 15 swaged on the external terminal 14 may be further welded to the external terminal 14 by laser welding etc. Thus welding the outer circumferential edge can enhance the strength of the joint between the internal terminal 15 and the external terminal 14. Moreover, although such welding adds to the manufacturing cost, the reliability of the conduction path between the internal terminal 15 and the external terminal 14 improves as the conduction path is formed on both the inside and outside of the internal terminal 15 and the external terminal 14.

In this embodiment, the external terminal 14 is joined to the internal terminal 15 at the weld 14d provided on a rear surface of the external terminal 14. The weld 14d, where surface coatings of the internal terminal 15 and the external terminal 14 are melted, has low resistance and can form a conduction path. In this case, the conduction path between the internal terminal 15 and the external terminal 14 can be made shorter compared with when, as in conventional practice, the leading end of the shaft part 15d of the internal terminal 15 is swaged around the insertion hole 14c of the external terminal 14 and the circumferential edge of the swaged shaft part 15d of the internal terminal 15 is welded. As a result, the structure in which the external terminal 14 is joined to the internal terminal 15 at the weld 14d provided on the rear surface of the external terminal 14 also contributes to lowering the battery resistance of the battery 10.

In the following, a manufacturing method of the battery 10 and a welding method of the weld 14d will be described. The manufacturing method of the battery 10 includes the steps of preparing a battery case component (here, the lid 11b), preparing the gasket 12, preparing the internal terminal 15, preparing the insulator 13, and preparing the external terminal 14, an assembly step, a welding step, and a swaging step.

The lid 11b as the battery case component prepared here preferably has the mounting hole 11c as described above. The gasket 12 prepared preferably has the cylindrical part 12a that is fittable into the mounting hole 11c as described above. The internal terminal 15 prepared preferably has the projecting part 15c that is fittable into the cylindrical part 12a and the shaft part 15d rising from the center portion of the projecting part 15c as described above. The insulator 13 prepared preferably has the through-hole 13d into which the projecting part 15c is fitted. The external terminal 14 prepared preferably has the insertion hole 14c through which the shaft part 15d is inserted.

Figure 3:
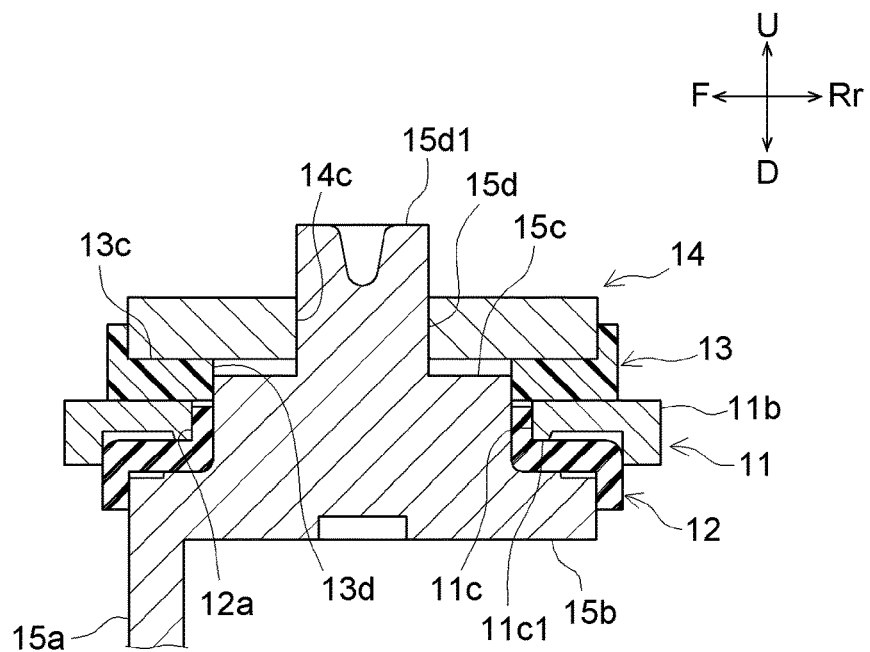
FIG. 3 is a sectional view showing the internal terminal 15, a gasket 12, a lid 11b, an insulator 13, and the external terminal 14 assembled in an assembly step.
Figure 4:
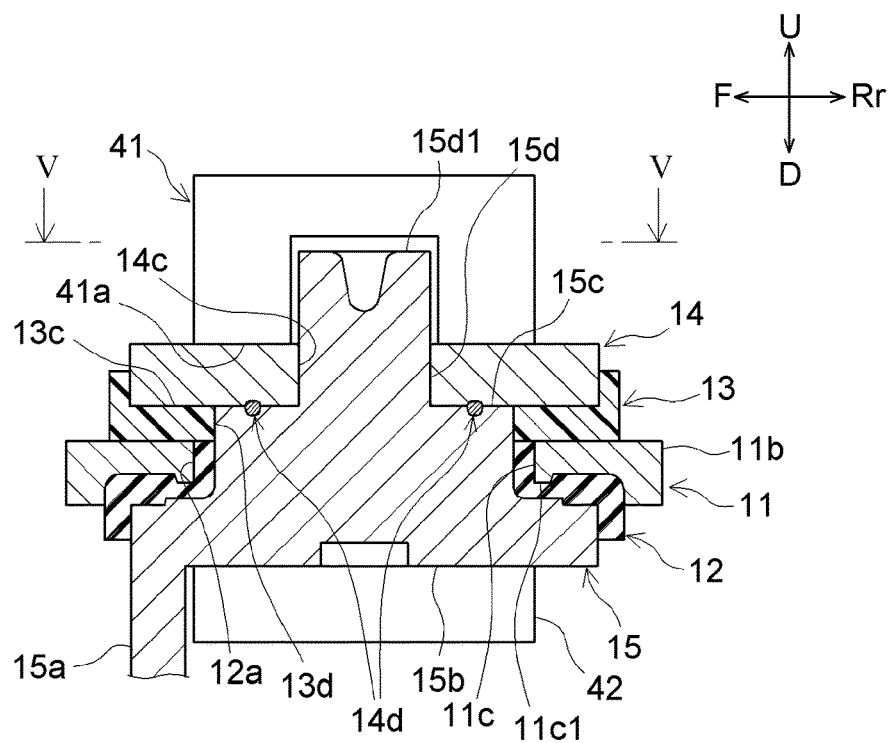
FIG. 4 is a sectional view showing a state where the external terminal 14 is pressed against a projecting part 15c of the internal terminal 15 in a welding step.

FIG. 3 is a sectional view showing the internal terminal 15, the gasket 12, the lid 11b, the insulator 13, and the external terminal 14 assembled in the assembly step. FIG. 4 is a sectional view showing a state where the external terminal 14 is pressed against the projecting part 15c of the internal terminal 15 in the welding step. FIG. 3 and FIG. 4 show a section of the lid 11b along the width direction.

As shown in FIG. 3, the assembly step is a step of assembling the internal terminal 15, the gasket 12, the lid 11b, the insulator 13, and the external terminal 14. In the assembly step, for example, the cylindrical part 12a of the gasket 12 is fitted into the mounting hole 11c of the lid 11b as the battery case component. The projecting part 15c of the internal terminal 15 is fitted into the cylindrical part 12a of the gasket 12. The insulator 13 is disposed on the outer surface of the lid 11b while the projecting part 15c is fitted into the through-hole 13d. The external terminal 14 is disposed on top of the insulator 13 such that the shaft part 15d is inserted through the insertion hole 14c. The order of assembling the internal terminal 15, the gasket 12, the lid 11b, the insulator 13, and the external terminal 14 in the assembly step is not limited to the above order. In the assembly step, for example, the gasket 12, the lid 11b, the insulator 13, and the external terminal 14 may be assembled onto the internal terminal 15 in this order.

In the welding step, the external terminal 14 and the projecting part 15c of the internal terminal 15 are welded together in a solid state by pressing the external terminal 14 against the projecting part 15c and vibrating the external terminal 14 or the internal terminal 15. In the swaging step, the shaft part 15d is swaged around the insertion hole 14c of the external terminal 14 after the welding step.

Here, in the welding step, as shown in FIG. 4, the internal terminal 15 and the external terminal 14 assembled in the assembly step as described above are held between a horn 41 and an anvil 42 (receiving jig). In this embodiment, the horn 41 is placed against an upper surface of the external terminal 14 and the anvil 42 is placed against a lower surface of the base part 15b of the internal terminal 15. Then, the external terminal 14 is pressed against the projecting part 15c of the internal terminal 15. When the external terminal 14 is pressed against the projecting part 15c of the internal terminal 15, the internal terminal 15, the gasket 12, the lid 11b, the insulator 13, and the external terminal 14 come in tight contact with one another. In addition, in this embodiment, the projection 11c1 provided at the edge of the mounting hole 11c of the lid 11b digs into the gasket 12.

Whether the external terminal 14 is sufficiently pressed against the projecting part 15c of the internal terminal 15 is determined based on a force with which the horn 41 and the anvil 42 hold the external terminal 14 and the internal terminal 15 therebetween. For example, when the required compression load is about 2000 N, the holding force of the horn 41 and the anvil 42 can be set to 2000 N. Thus, it is guaranteed that the internal terminal 15, the gasket 12, the lid 11b, the insulator 13, and the external terminal 14 will come in tight contact with each other, and that the projection 11c1 provided at the edge of the mounting hole 11c of the lid 11b will dig into the gasket 12.

Next, ultrasonic vibration is applied by the horn 41 in the state where the external terminal 14 is pressed against the projecting part 15c of the internal terminal 15. As a result, the external terminal 14 and the projecting part 15c of the internal terminal 15 pressed against each other by being held between the horn 41 and the anvil 42 (receiving jig) are welded together. Here, portions of the external terminal 14 and the projecting part 15c of the internal terminal 15 that are held between the horn 41 and the anvil 42 (receiving jig) and directly subjected to the pressing force are welded together. Thus, in the welding step, the internal terminal 15 and the external terminal 14 can be held between the horn 41 and the anvil 42, and ultrasonic vibration can be applied to the internal terminal 15 or the external terminal 14 while the external terminal 14 and the projecting part 15c of the internal terminal 15 are pressed against each other.

Figure 5:
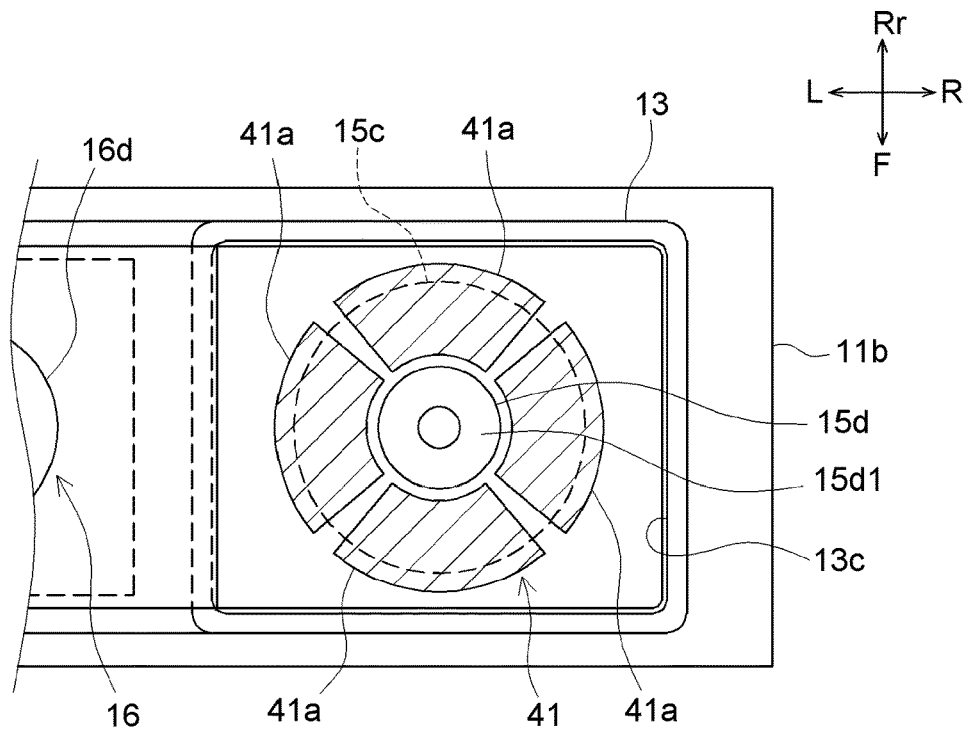
FIG. 5 is a plan view taken along line V-V in FIG. 4.

FIG. 5 is a plan view taken along line V-V in FIG. 4. FIG. 5 shows a part where the external terminal 14 is pressed against the projecting part 15c of the internal terminal 15. As shown in FIG. 4 and FIG. 5, the horn 41 is pressed against the external terminal 14. In this embodiment, as shown in FIG. 5, the horn 41 includes four legs 41a. The legs 41a each have an arc-shaped end surface and are disposed evenly in the circumferential direction. Although this is not shown, the horn 41 is mounted in a press device and a vibration generation device. The anvil 42 is mounted in the press device so as to face the horn 41. In this embodiment, the four legs 41a of the horn 41 are placed against the external terminal 14 around the insertion hole 14c of the external terminal 14. The anvil 42 is placed against the base part 15b of the internal terminal 15 at a position facing the horn 41.

In this example, a pressing force exerted by the horn 41 is checked with a sensor, and ultrasonic vibration is applied to the horn 41 in a state where a predetermined pressing force is exerted. Here, the external terminal 14 vibrates in the state where the internal terminal 15, the gasket 12, the lid 11b, the insulator 13, and the external terminal 14 are in tight contact with one another and the projection 11c1 provided at the edge of the mounting hole 11c of the lid 11b digs into the gasket 12. Here, the internal terminal 15 against which the anvil 42 is pressed is fixed, while the external terminal 14 against which the horn 41 is pressed vibrates in synchronization with the horn 41. Vibration applied to the external terminal 14 through the horn 41 preferably has such a frequency that the internal terminal 15 and the external terminal 14 are welded together in a solid state. In this aspect, vibration applied to the external terminal 14 through the horn 41 is preferably not lower than 20 kHz nor higher than 100 kHz, for example.

For example, vibration of the horn 41 is preferably applied in the circumferential direction around a central axis of the shaft part 15d of the internal terminal 15. By such ultrasonic vibration, joint interfaces of the external terminal 14 and the projecting part 15c of the internal terminal 15 are welded together in a solid state. In other words, the internal terminal 15 and the external terminal 14 are welded together at a temperature lower than the melting temperatures thereof.

As a result, for example, the external terminal 14 and the projecting part 15c of the internal terminal 15 are preferably welded together along the circumferential direction around the shaft part 15d of the internal terminal 15. Thus, the weld 14d may have an arc shape. The weld 14d preferably has an area required to provide required strength. For example, the weld 14d preferably has an area of not smaller than 20 mm$^2$ (e.g., 30 mm$^2$).

In this embodiment, vibration is applied to the external terminal 14 through the horn 41, but the present disclosure is not limited to this example. For example, although this is not shown, the external terminal 14 may be pressed by the anvil and the horn may be mounted on the internal terminal 15, and vibration may be applied to the internal terminal 15 through the horn.

Figure 6:
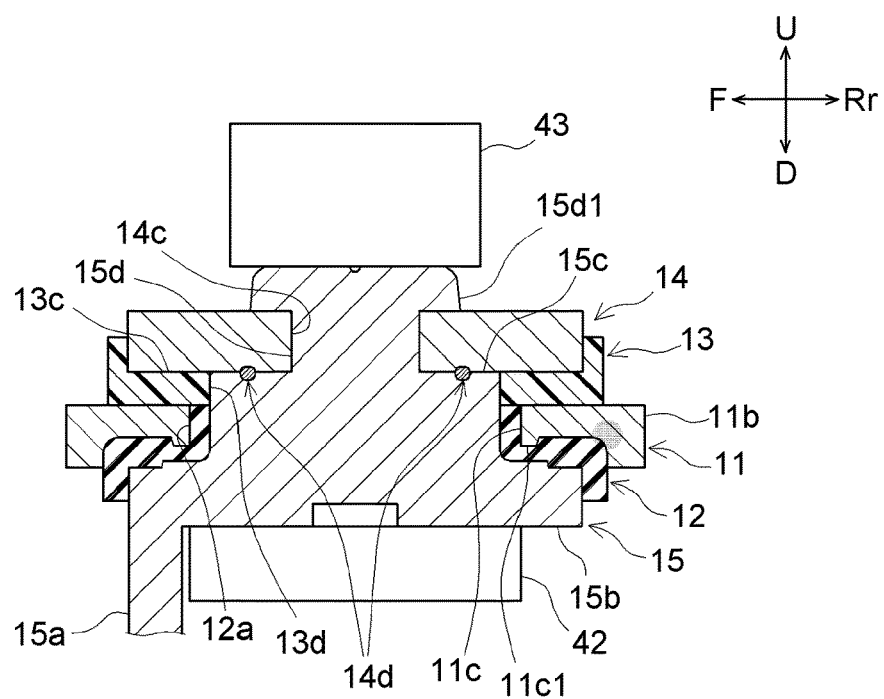
FIG. 6 is a sectional view showing a swaging step.

FIG. 6 is a sectional view showing the swaging step. As shown in FIG. 6, in the swaging step, the shaft part 15d is swaged around the insertion hole 14c of the external terminal 14 after the welding step. Here, as shown in FIG. 6, the horn 41 used in the welding step is removed, and the leading end 15d1 of the shaft part 15d of the internal terminal 15 is pressed and compressively deformed by a swaging member 43. While the swaging member 43 is schematically depicted in FIG. 6, the leading end 15d1 of the shaft part 15d of the internal terminal 15 may be compressively deformed by the swaging member 43 that rotates.

While the battery 10, the manufacturing method of the battery 10, and the welding method of the weld 14d have been described above, the battery 10, the manufacturing method of the battery 10, and the welding method of the weld 14d are not limited to the forms described above.

Figure 7:
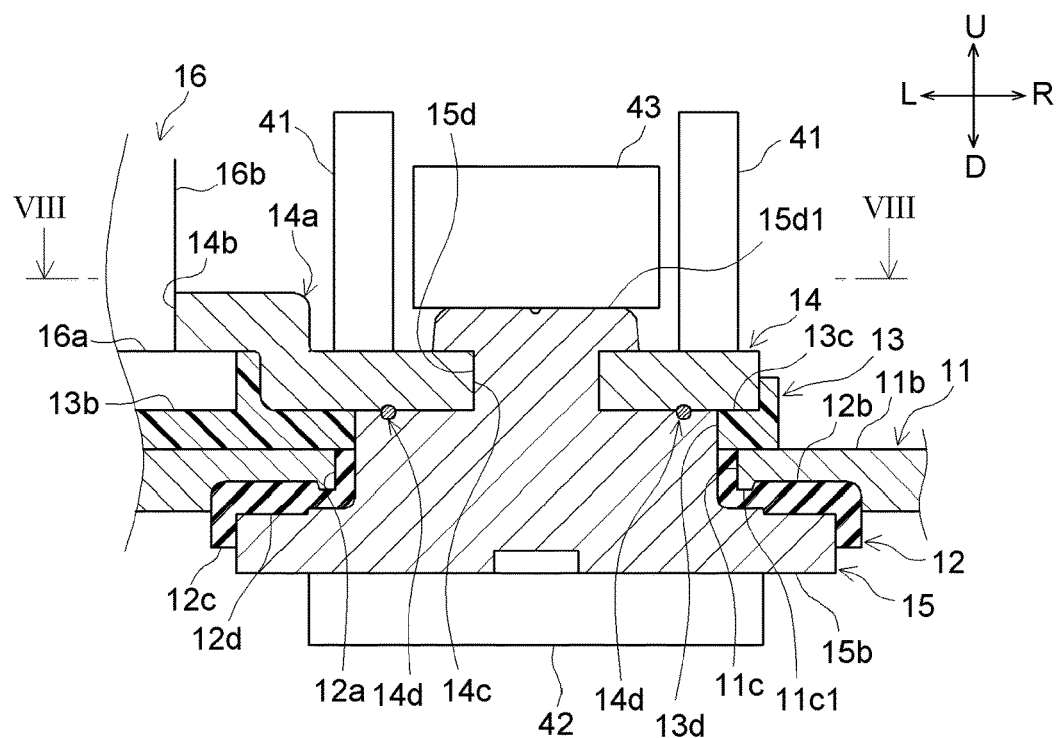
FIG. 7 is a sectional view showing a state where the external terminal 14 is pressed against the projecting part 15c of the internal terminal 15 in a welding step of another form.
Figure 8:
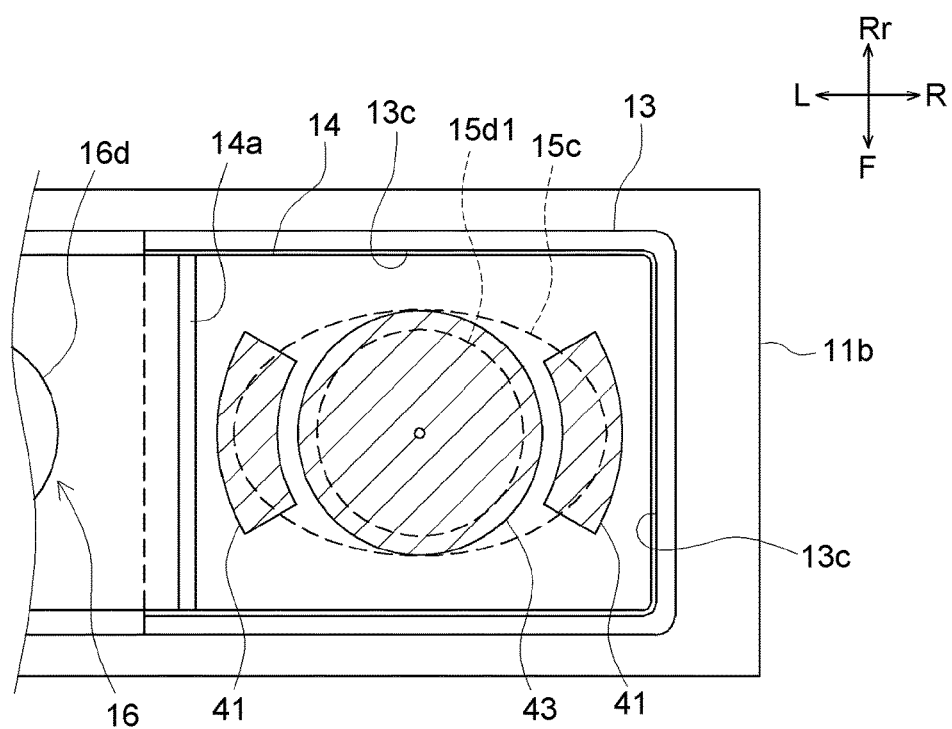
FIG. 8 is a plan view taken along line VIII-VIII in FIG. 7.

Here, FIG. 7 is a sectional view showing a state where the external terminal 14 is pressed against the projecting part 15c of the internal terminal 15 in a welding step of another form. FIG. 8 is a plan view taken along line VIII-VIII in FIG. 7. FIG. 8 shows a part where the external terminal 14 is pressed against the projecting part 15c of the internal terminal 15.

For example, as shown in FIG. 7 and FIG. 8, the weld 14d at which the external terminal 14 is welded to the internal terminal 15 may be located farther on a radially outer side (i.e., on an outer side in a radial direction of the shaft part 15d) than the portion of the shaft part 15d that is swaged around the insertion hole 14c of the external terminal 14. In the example shown in FIG. 7 and FIG. 8, the projecting part 15c of the internal terminal 15 has an elliptical shape of which a longitudinal axis is set along the longitudinal direction of the lid 11b. In this embodiment, the horns 41 are disposed at two points apart from each other along the longitudinal axis of the projecting part 15c of the internal terminal 15. The swaging member 43 that presses and compressively deforms the shaft part 15d of the internal terminal 15 is disposed in a space between the horns 41.

In this embodiment, the external terminal 14 is pressed against the internal terminal 15 by the horns 41, and ultrasonic vibration is applied to weld together the external terminal 14 and the internal terminal 15 at portions at which the external terminal 14 is pressed by the horns 41. Then, the shaft part 15d of the internal terminal 15 is swaged around the insertion hole 14c of the external terminal 14 by the swaging member 43. Here, the portion of the shaft part 15d of the internal terminal 15 that is swaged around the insertion hole 14c of the external terminal 14 by the swaging member 43 is provided farther on the inner side than the weld 14d. In other words, the portions at which the external terminal 14 is welded to the internal terminal 15 are located farther on the radially outer side than the portion of the shaft part 15d of the internal terminal 15 that is swaged around the insertion hole 14c of the external terminal 14. Thus, the external force exerted when the shaft part 15d of the internal terminal 15 is swaged around the insertion hole 14c of the external terminal 14 by the swaging member 43 is less likely to be exerted on the weld 14d. Although this is not shown, the outer circumferential edge of the swaged shaft part 15d of the internal terminal 15 may be further welded to the external terminal 14. Thus welding the outer circumferential edge can enhance the strength of the joint between the internal terminal 15 and the external terminal 14. Laser welding may be used for this welding.

Figure 9:
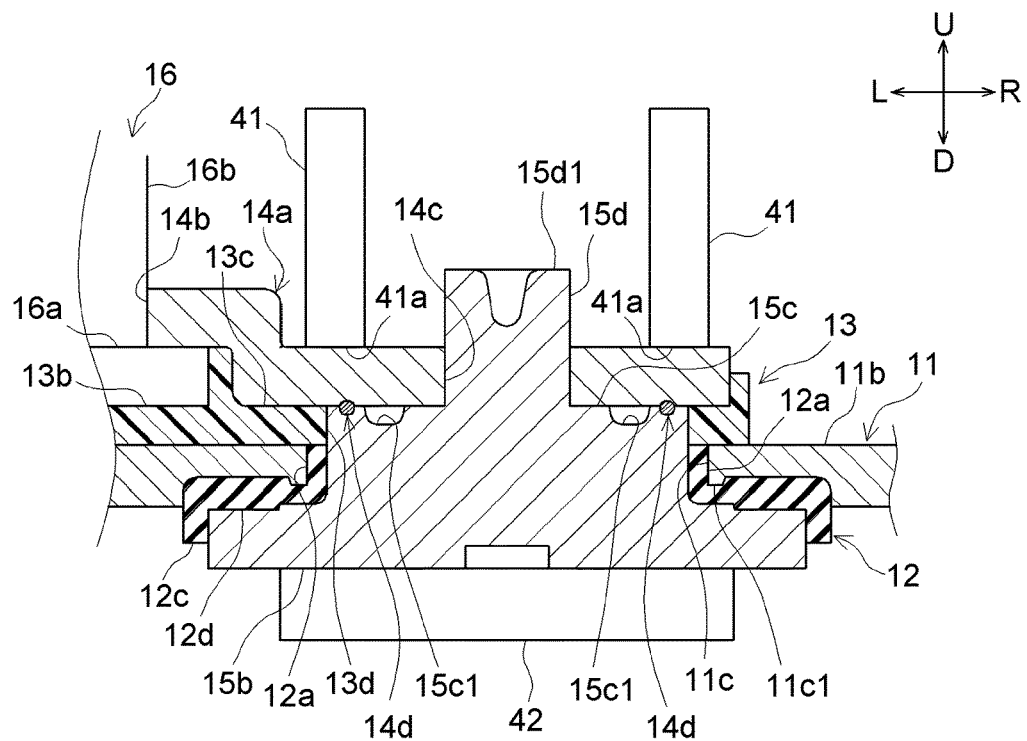
FIG. 9 is a sectional view showing a state where the external terminal 14 is pressed against the projecting part 15c of the internal terminal 15 in a welding step of another form.
Figure 10:
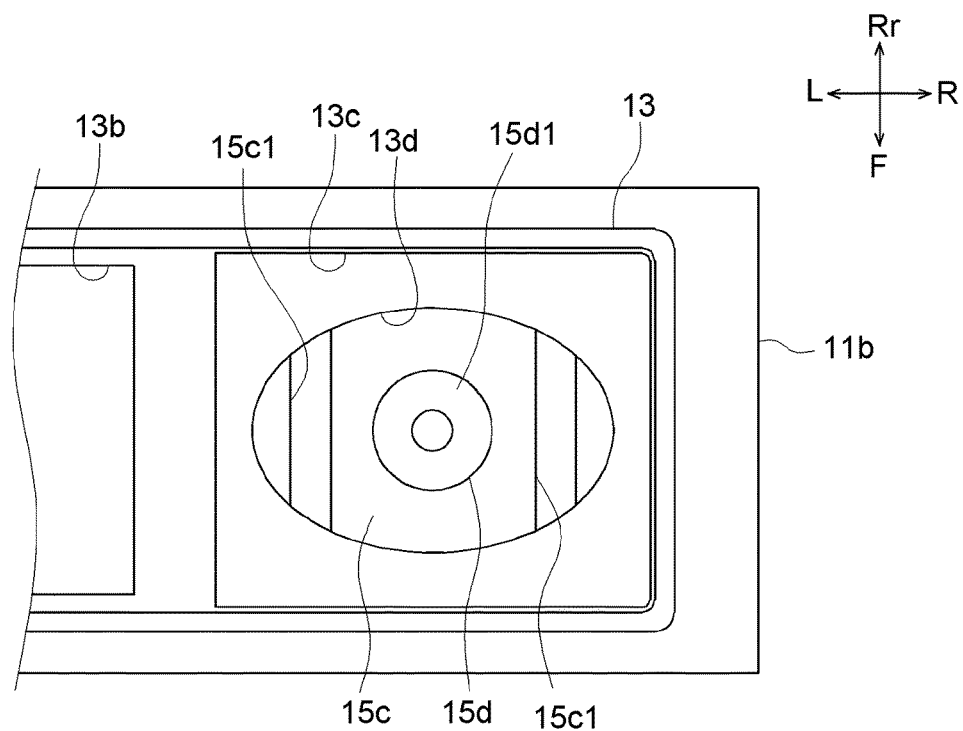
FIG. 10 is a plan view showing a state where the insulator 13 is assembled on the projecting part 15c of the internal terminal 15 in an assembly step of another form.

Here, FIG. 9 is a sectional view showing a state where the external terminal 14 is pressed against the projecting part 15c of the internal terminal 15 in a welding step of another form. FIG. 10 is a plan view showing a state where the insulator 13 is assembled on the projecting part 15c of the internal terminal 15 in the assembly step.

As shown in FIG. 9 and FIG. 10, grooves 15c1 are provided in the projecting part 15c of the internal terminal 15 to which the external terminal 14 is joined. When the external terminal 14 is assembled onto the projecting part 15c, a foreign object can be caught between the projecting part 15c and the external terminal 14. In this case, since the grooves 15c1 are provided in the projecting part 15c, the foreign object falls into one of the grooves 15c1, which allows the projecting part 15c and the external terminal 14 to be welded together more reliably. For example, as shown in FIG. 9, in the radial direction of the shaft part 15d of the internal terminal 15, the groove 15c1 may be provided farther on the inner side than a position at which the external terminal 14 is pressed by the horn 41. That is, the groove 15c1 is preferably formed in the projecting part 15c of the internal terminal 15 at a position closer to the shaft part 15d in the radial direction of the shaft part 15d than the weld 14d is at which the external terminal 14 is welded to the projecting part 15c. In other words, the groove 15c1 is preferably formed in the projecting part 15c at a position closer to the insertion hole 14c of the external terminal 14 through which the shaft part 15d is inserted.

The groove 15c1 is preferably formed in the projecting part 15c such that a foreign object of 50 µm to about 200 µm falls into the groove 15c1 when the external terminal 14 is assembled onto the projecting part 15c. In this aspect, the groove 15c1 preferably has a depth of 200 µm to about 500 µm. The groove 15c1 preferably has a width of 200 µm to about 2 mm. In the example of FIG. 10, each groove 15c1 has a linear shape, but the shape etc. of the groove 15c1 are not particularly limited.

Figure 11:
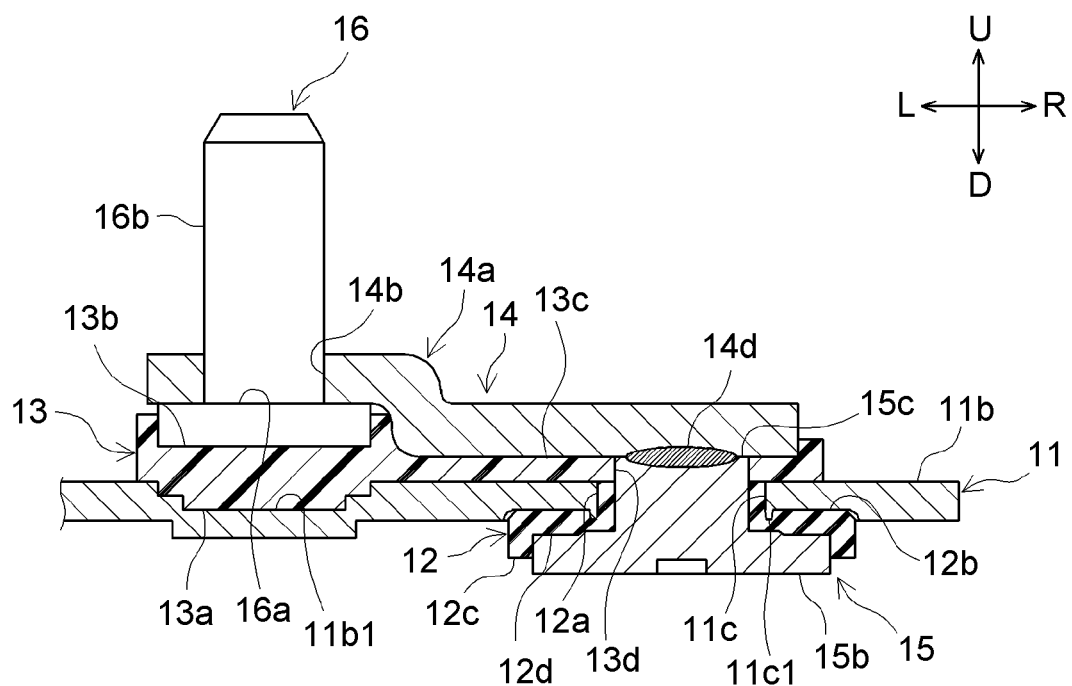
FIG. 11 is a sectional view showing another embodiment of the battery proposed herein.

FIG. 11 is a sectional view showing another embodiment of the battery proposed herein. In the form shown in FIG. 11, the external terminal 14 is laid on and welded to the projecting part 15c of the internal terminal 15. Here, the internal terminal 15 includes the projecting part 15c that is fitted on the lid 11b (battery case component) by being inserted through the mounting hole 11c with the gasket 12 and the insulator 13 as the insulation members interposed between the projecting part 15c and the mounting hole 11c. The external terminal 14 is laid on the projecting part 15c inserted through the mounting hole 11c, and includes the weld 14d at which the external terminal 14 is welded to the internal terminal 15, at the portion of the external terminal 14 that is laid on the projecting part 15c.

In the form shown in FIG. 11, the cylindrical part 12a of the gasket 12 is fitted into the mounting hole 11c of the lid 11b in the assembly step of assembling the internal terminal 15, the gasket 12, the lid 11b, the insulator 13, and the external terminal 14. The projecting part 15c of the internal terminal 15 is fitted into the cylindrical part 12a of the gasket 12. The insulator 13 is disposed on the outer surface of the lid 11b while the projecting part 15c is fitted into the through-hole 13d. The external terminal 14 is disposed on top of the insulator 13 so as to lie on the projecting part 15c. In the welding step, the external terminal 14 is pressed against the projecting part 15c of the internal terminal 15, and the external terminal 14 or the internal terminal 15 is vibrated to thereby weld together the projecting part 15c and the external terminal 14 in a solid state.

In this case, the internal terminal 15 and the external terminal 14 are welded together over a large area at the portion of the external terminal 14 that is laid on the projecting part 15c. In the welding step, for example, a horn is pressed against the external terminal 14 and an anvil is pressed against the base part 15b of the internal terminal 15 at a position facing the horn. Then, the external terminal 14 is vibrated through the horn while the external terminal 14 is pressed against the projecting part 15c of the internal terminal 15 by the horn and the anvil.

Thus, the external terminal 14 is welded to the projecting part 15c of the internal terminal 15 in a solid state at the portion of the external terminal 14 that is pressed against the projecting part 15c of the internal terminal 15. The internal terminal 15 and the external terminal 14 are preferably joined together with required strength at this welded portion. Although this is not adopted in the example shown in FIG. 11, a groove (see FIG. 9) into which a foreign object falls may be formed at an appropriate position in an upper surface of the projecting part 15c.

In the embodiment shown in FIG. 11, the shaft part 15d (see FIG. 2) is not provided on the projecting part 15c. Moreover, the external terminal 14 does not have the insertion hole 14c (see FIG. 2) through which the shaft part 15d is inserted. In this case, although the shaft part 15d is not swaged around the insertion hole 14c of the external terminal 14, the external terminal 14 is preferably welded over a large area to the projecting part 15c of the internal terminal 15 such that the external terminal 14 and the internal terminal 15 are welded together with required strength.

As has been described above, in the battery 10 proposed herein, welding between the internal terminal 15 and the external terminal 14 is realized without using laser welding in the welding step for securing a conduction path between the internal terminal 15 and the external terminal 14. The conduction path between the internal terminal 15 and the external terminal 14 is formed in a contact portion between the internal terminal 15 and the external terminal 14 that is not exposed to outside. Thus, high quality of the conduction path between the internal terminal 15 and the external terminal 14 is likely to be maintained. Moreover, the facility cost can be kept down, since a solid-state welding machine that is inexpensive compared with a laser welding machine is used in the welding step for forming the conduction path between the internal terminal and the external terminal.

Thus, various aspects of the battery and the battery manufacturing method proposed herein have been described. Unless otherwise mentioned, the embodiments etc. of the battery and the battery manufacturing method presented herein do not limit the present disclosure. For example, the structures of the battery case and the electrode body are not limited unless otherwise mentioned.

For example, in the above embodiment, the internal terminal 15 and the external terminal 14 are mounted on the lid 11b as the battery case component, but the present disclosure is not limited to this form depending on the structure of the battery case. That is, the battery case component is not limited to the lid. The internal terminal 15 and the external terminal 14 may be mounted on the case main body that houses the electrode body. In this case, the case main body can constitute the battery case component. In the above embodiment, the gasket 12 and the insulator 13 have been illustrated as the insulation members, but the insulation members are not limited to the above form as long as the insulation members are interposed between the internal terminal 15 and the external terminal 14 on one side and the battery case component on the other side.

What is claimed is:

1. A battery comprising:
   a battery case component having a mounting hole;
   an internal terminal;
   an external terminal; and
   an insulation member interposed between the internal terminal and the battery case component and interposed between the external terminal and the battery case component, wherein:
   the internal terminal includes a base part that is laid on an inner side of the battery case component with the insulation member interposed between the base part and the battery case component, and a projecting part that protrudes from the base part and is fitted on the battery case component by being inserted through the mounting hole with the insulation member interposed between the projecting part and an inner periphery of the battery case component defining the mounting hole; and
   the external terminal is laid on the projecting part inserted through the mounting hole and includes a weld, which is located at a portion of the external terminal that faces toward the battery case component, at which the external terminal is welded to the projecting part of the internal terminal.

2. The battery according to claim 1, wherein:
the internal terminal further has a shaft part rising from a center portion of an upper surface of the projecting part, wherein the external terminal is welded to the upper surface of the projecting part by the weld;
the external terminal further has an insertion hole through which the shaft part is inserted; and
the shaft part is inserted through the insertion hole and swaged around the insertion hole.

3. The battery according to claim 2, wherein the weld is located farther on a radially outer side than a portion of the shaft part that is swaged around the insertion hole.

4. The battery according to claim 1, wherein the projecting part to which the external terminal is joined has a groove.

5. The battery according to claim 1, wherein the external terminal and the projecting part are welded together along a circumferential direction around a shaft part of the internal terminal.

6. The battery according to claim 1, wherein:
the insulation member includes a gasket that has a flange part laid on an inner surface of the battery case component around the mounting hole and a cylindrical part protruding from the flange part and fitted in the mounting hole, and an insulator that has a through-hole in which the projecting part inserted through the mounting hole is fitted and that is laid on an outer surface of the battery case component;
the base part of the internal terminal is laid on the gasket on the inner side of the battery case component;
the projecting part is fitted in the mounting hole of the battery case component by being inserted through the cylindrical part of the gasket; and
the external terminal is laid on an outer side of the battery case component with the insulator interposed between the external terminal and the battery case component.

7. A battery manufacturing method comprising:
preparing a battery case component in which a mounting hole is formed;
preparing a gasket having a cylindrical part that is fittable into the mounting hole;
preparing an internal terminal having a projecting part that is fittable into the cylindrical part;
preparing an insulator having a through-hole into which the projecting part is fitted;
preparing an external terminal that is disposed on top of the insulator so as to lie on the projecting part;
assembling the internal terminal, the gasket, the battery case component, the insulator, and the external terminal into a state where the cylindrical part of the gasket is fitted in the mounting hole of the battery case component, the projecting part of the internal terminal is fitted in the cylindrical part of the gasket, the insulator is disposed on an outer surface of the battery case component with the projecting part fitted in the through-hole, and the external terminal is disposed on top of the insulator so as to lie on the projecting part; and
welding together the external terminal and the projecting part of the internal terminal in a solid state by pressing the external terminal against the projecting part and vibrating the external terminal or the internal terminal.

8. The battery manufacturing method according to claim 7, wherein:
the internal terminal prepared has a shaft part rising from the projecting part;
the external terminal prepared has an insertion hole through which the shaft part is inserted;
when the internal terminal, the gasket, the battery case component, the insulator, and the external terminal are assembled, the external terminal is disposed on top of the insulator such that the shaft part is inserted through the insertion hole; and
the battery manufacturing method further comprises swaging the shaft part around the insertion hole after welding together the projecting part and the external terminal.

9. The battery manufacturing method according to claim 7, wherein, when the projecting part and the external terminal are welded together, the internal terminal and the external terminal are held between a horn and an anvil, and ultrasonic vibration is applied to the internal terminal or the external terminal while the external terminal and the projecting part of the internal terminal are pressed against each other.

* * * * *